United States Patent [19]

Rey-Bellet et al.

[11] 3,715,357
[45] Feb. 6, 1973

[54] N-OXIDES OF BENZYLPYRIMIDINES

[75] Inventors: Gerald Rey-Bellet, Basel; Daniel Ernest Schwartz, Pfeffingen; Roland Reiner, Basel, all of Switzerland

[73] Assignee: Hoffmann-La Roche, Inc., Nutley, N.J.

[22] Filed: June 4, 1970

[21] Appl. No.: 43,607

[30] Foreign Application Priority Data

June 12, 1969   Switzerland..........................8970/69

[52] U.S. Cl.............260/256.4 N, 424/200, 424/229, 424/251
[51] Int. Cl. ..............................................C07d 51/42
[58] Field of Search................260/256.4 N, 256.4 H

[56] References Cited

UNITED STATES PATENTS

| | | | |
|---|---|---|---|
| 3,485,840 | 12/1969 | Hoffer | 260/256.4 N |
| 3,464,987 | 9/1969 | Ursprung et al. | 260/256.4 H |
| 3,382,247 | 5/1968 | Anthony et al. | 260/256.4 N |
| 3,341,541 | 9/1967 | Hoffer | 260/256.4 N |
| 3,159,628 | 12/1964 | Pachter et al. | 260/256.4 N |
| 2,518,130 | 8/1950 | Evans et al. | 260/DIG. 12 |
| 2,500,131 | 3/1950 | Linsker | 260/DIG. 12 |

OTHER PUBLICATIONS

Culvenor, Revs. Pure Appli Chem. 3, 86 (1953).

*Primary Examiner*—Alex Mazel
*Assistant Examiner*—R. J. Gallagher
*Attorney*—Samuel L. Welt, Bernard S. Leon, William G. Isgro and Jon S. Saxe

[57]   ABSTRACT

Antibacterially active N-oxides of 2,4-diamino-benzyl-pyrimidines are described.

11 Claims, No Drawings

N-OXIDES OF BENZYLPYRIMIDINES

BRIEF SUMMARY OF THE INVENTION

The invention relates to the N-oxides of benzylpyrimidines of the formulas

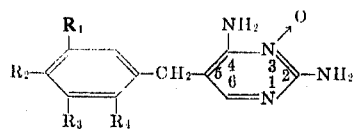

and

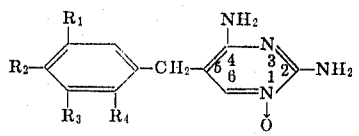

wherein $R^1$ and $R^2$ are halogen, $C_1$—$C_4$ alkoxy or benzyloxy; $R^3$ is hydrogen, halogen, $C_1$—$C_4$ alkoxy or benzyloxy; or $R^1$ together with $R^2$, or $R^2$ together with $R^3$ is methylenedioxy; and $R^4$ is hydrogen or, when $R^3$ is hydrogen, $R^4$ may also be $C_1$—$C_4$ alkyl, $C_1$—$C_4$ alkoxy, benzyloxy or halogen, and their pharmaceutically acceptable acid addition salts.

DETAILED DESCRIPTION OF THE INVENTION

The compounds of formulas Ia and Ib and their pharmaceutically acceptable acid addition salts are prepared in accordance with the invention by oxidizing a compound of the formula

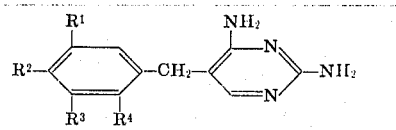

wherein $R^1$, $R^2$, $R^3$ and $dR^4$ are as described above, whereby an oxygen atom is introduced to either the $N_1$ or $N_3$ ring nitrogen, i.e., N-oxidation.

The terms "$C_1$—$C_4$ alkyl" and "$C_1$—$C_4$ alkoxy" denote straight chain or branched chain alkyl groups of from 1 to 4 carbon atoms, such as methyl, ethyl, propyl, i-propyl, butyl, tert.-butyl; methyl is preferred. The term halogen denotes all four halogens, i.e. fluorine, chlorine, bromine or iodine; chlorine and bromine are preferred.

The N-oxidation can be carried out according to known methods utilizing conventional N-oxidizing agents, for example, perbenzoic acid, and the like; most preferred is m-chloro-perbenzoic acid.

The N-oxidation is expediently carried out in an inert solvent, for example, a chlorinated hydrocarbon such as chloroform, methylene chloride and the like; in an alcohol such as methanol, ethanol and the like; in dimethylformamide or dimethylsulfoxide or in water. A preferred solvent is dioxane; when N-oxidizing in this solvent, the N-oxides are obtained in good yield.

The temperature at which the reaction is carried out may be in the range of between room temperature and the boiling point of the solvent. Conveniently, it may be between about 20° and about 100° C. The range of from about 40° to about 60° is preferred.

The N-oxides of the invention can be isolated from the reaction mixture by conventional means. For instance, when using m-chloro-perbenzoic acid or perbenzoic acid as the N-oxidizing agent, the reaction solution is shaken out with a weakly alkaline aqueous solution, for example, with aqueous sodium bicarbonate solution. The aqueous extract obtained is made acidic for the purpose of precipitating the excess acid, which is removed by filtration, and thereafter the filtrate is made neutral or weakly basic.

The N-oxidation of the compounds of formula II leads to mixtures of $N_1$- and $N_3$-oxides of formulas Ib and Ia, respectively, and such isomeric mixtures are also within the scope of the invention.

The separation and purification of the isomeric products obtained from the reaction mixture is effected by chromatography, for example, column chromatography, and/or recrystallization, preferably from a polar solvent such as alcohols, water and the like.

The compounds of formulas Ia and Ib form acid addition salts with pharmaceutically acceptable acid addition salts. Such acids comprise inorganic acids such as hydrochloric acid, sulfuric acid, phosphoric acid and the like, or organic acids such as citric acid, maleic acid, fumaric acid, tartaric acid and the like.

The compounds of formulas Ia and Ib, including their isomeric mixtures, as well as pharmaceutically acceptable acid addition salts thereof, are distinguished by their high antibacterial activity, and also by the fact that they are capable of potentiating the activity of sulfonamides such as sulfisoxazole, sulfadimethoxine, sulfamethoxazole, 4-sulfanilamido-5,6-dimethoxypyrimidine, 2-sulfanilamido-4,5-dimethyl-pyrimidine or sulfa-quinoxaline. The preferred compounds are the N-oxides of 2,4-diamino-5-(3,4,5-trimethoxybenzyl)pyrimidine.

For antibacterial use, in combinations comprising of one or more of the N-oxides of formulas Ia and Ib with a sulfonamide mentioned above, for oral, rectal and parenteral application, the ratio of N-oxide to sulfonamide can vary within a wide range, for example, from about 1 part to about 20 parts by weight of sulfonamide per part by weight of N-oxide of the invention. A preferred ratio is one part by weight of N-oxide of the invention per 5 parts by weight of the sulfonamide.

Thus, for example, a tablet can contain 80 mg. of an N-oxide of the invention and 400 mg. of sulfamethoxazole. A pediatric tablet can contain 20 mg. of an N-oxide of the invention and 100 mg. of sulfamethoxazole. A syrup can contain (per 5 ml.) 40 mg. of the N-oxide and 200 mg. of sulfamethoxazole.

The N-oxides of the invention can accordingly be used as medicaments; for example, in the form of pharmaceutical preparations which contain them or their pharmaceutically acceptable acid addition salts in admixture with a pharmaceutical, organic or inorganic inert carrier, which is suitable for oral, rectal or parenteral application, for example, water, gelatin, gum arabic, lactose, starches, magnesium stearate, talc, vegetable oils, polyalkyleneglycols, etc. The pharmaceutical preparations can be solid in form, for example, as tablets, dragees, suppositories or capsules; in semi-solid form, for example, as ointments, or in liquid form, for example, as solutions such as syrups, injectables, suspensions or emulsions. The pharmaceutical preparations may be sterilized and/or contain additives such as preserving, stabilizing, wetting or emulsifying agents, salts for varying the osmotic pressure or buffers. They can also contain in combination, other therapeutically valuable substances.

The following examples further illustrate the invention. All temperatures are in degrees Centigrade, unless otherwise mentioned.

EXAMPLE 1

Preparation of the $N_1$-oxide of 2,4-diamino-5-(3,4,5-trimethoxybenzyl)-pyrimidine and the $N_3$-oxide of 2,4-diamino-5-(3,4,5-trimethoxy-benzyl)-pyrimidine 14.5 g. of 2,4-diamino-5-(3,4,5-trimethoxy-benzyl)-pyrimidine are dissolved in 250 ml. of methylene chloride and 12 g. of m-chloro-perbenzoic acid are added all at once to this solution. The mixture warms with complete dissolution. Care is taken that the temperature of the mixture does not exceed 30°, with the aid of a cold bath. The reaction mixture is subsequently maintained at 40° for an additional 60 hours, allowed to cool and vigorously shaken with aqueous sodium bicarbonate solution.

The aqueous phase is separated and made Congo-acidic with hydrochloric acid. The precipitated m-chloro-benzoic acid is removed by filtration and the filtrate is evaporated to dryness under reduced pressure at 20°. The residue is dissolved in some water with slight heating, and the solution is adjusted to pH 8–9 with concentrated ammonia and allowed to stand. A mixture of two compounds crystallizes which can be separated by repeated re-solution from water and from n-propanol. The two compounds comprise, on the one hand, the $N_1$-oxide of 2,4-diamino-5-(3,4,5-trimethoxy-benzyl)-pyrimidine, and on the other hand, the $N_3$-oxide of 2,4-diamino-5-(3,4,5-trimethoxy-benzyl)-pyrimidine. The separation is followed by thin layer chromatography (plate: silica gel; developing agent: chloroform, n-propanol, concentrated ammonia = 80:20:1).

The one N-oxide melts at 260° (dec.); the other melts at 225°–227°. Element analysis, NMR and mass spectrum are in both cases in conformity with the postulated structure of a 2,4-diamino-5-(3,4,5-trimethoxy-benzyl)-pyrimidine N-oxide of the empirical formula $C_{14}H_{18}O_4N_4$.

EXAMPLE 2

Preparation of the $N_1$-oxide of 2,4-diamino-5-(3,4-dimethoxy-benzyl)-pyrimidine and the $N_3$-oxide of 2,4-diamino-5-(3,4-dimethoxybenzyl)-pyrimidine A solution containing 13 g. of 2,4-diamino-5-(3,4-dimethoxy-benxyl)-pyrimidine in 250 ml. of methylene chloride is treated all at once with stirring, with 12 g. of m-chloro-perbenzoic acid. With slight warming, after a few minutes there forms a clear solution which is maintained at 40° for 48 hours. Thereafter, the reaction mixture is allowed to cool, shaken with aqueous sodium bicarbonate solution, and the aqueous phase is separated. The aqueous phase is made Congo-acidic with hydrochloric acid, filtered from the precipitated m-chloro-benzoic acid and the filtrate is evaporated to dryness under reduced pressure at 20°. The residue is suspended in some water. The resulting suspension is adjusted to pH 8–9 with concentrated ammonia and allowed to stand, whereupon there crystallizes a mixture of two compounds, i.e., the $N_1$-oxide of 2,4-diamino-5-(3,4-dimethoxy-benzyl)-pyrimidine and the $N_3$-oxide of 2,4-diamino-5-(3,4-dimethoxy-benzyl)-pyrimidine, which is separated by column chromatography on silica gel (eluant: chloroform, n-propanol, concentrated ammonia = 80:20:1). The one N-oxide is recrystallized from methanol-water and melts at approximately 290°; the other N-oxide is recrystallized from ethanol and melts at 209°–211°. Element analysis, NMR and mass spectrum are in both cases in conformity with the postulated structure of a 2,4-diamino-5-(3,4-dimethoxy-benzyl)-pyrimidine N-oxide of the empirical formula $C_{13}H_{16}O_3N_4$.

EXAMPLE 3

Preparation of the $N_1$-oxide of 2,4-diamino-5-(4,5-dimethoxy-2-methylbenzyl)-pyrimidine and the $N_3$-oxide of 2,4-diamino-5-(4,5-dimethoxy-2-methylbenzyl)-pyrimidine 54.8 g. of 2,4-diamino-5-(4,5-dimethoxy-2-methylbenzyl)pyrimidine are dissolved in 1,000 ml. of methylene chloride and to this solution are added all at once 48 g. of m-chloro-per-benzoic acid. The mixture warms with complete dissolution. Care is taken, with the aid of a cold bath, that the temperature of the mixture does not exceed 30°. The reaction mixture is subsequently maintained at 50° for an additional 60 hours, allowed to cool and vigorously shaken with aqueous sodium bicarbonate solution. The aqueous phase is separated and made Congo-acidic with hydrochloric acid. The precipitated m-chlorobenzoic acid is removed by filtration and the filtrate is evaporated to dryness under reduced pressure at 20°C. The residue is suspended in some water. The suspension is adjusted to a pH 8–9 with concentrated ammonia and filtered with suction. The solid residue is separated by column chromatography on silica gel (eluant: chloroform, n-propanol, concentrated ammonia=80:20:1). The N-oxide of 2,4-diamino-5-(4,5-dimethoxy-2-methylbenzyl)-pyrimidine rapidly separates into both of its isomers, i.e., the $N_1$-oxide of 2,4-diamino-5-(4,5-dimethoxy-2-methylbenzyl)-pyrimidine and the $N_3$-oxide of 2,4-diamino-5-(4,5-dimethoxy-2-methylbenzyl)-pyrimidine. One N-oxide is recrystallized from methanol-water and melts with decomposition at approximately 300°; the other N-oxide is first recrystallized from water, then from methanol and melts at about 240°–243°.

EXAMPLE 4

Preparation of the $N_1$-oxide of 2,4-diamino-5-(2,4,5-trichloro-benzyl)-pyrimidine and the $N_3$-oxide of 2,4-diamino-5-(2,4,5-trichloro-benzyl)-pyrimidine 30 g. of 2,4-diamino-5-(2,4,5-trichloro-benzyl)-pyrimidine are dissolved in 150 ml. of dimethylformamide, and to this solution are added 24 g. of m-chloroperbenzoic acid all at once. The mixture warms with complete dissolution. Care is taken, with the aid of a cold bath, that the temperature of the mixture does not exceed 30° C. Thereafter, the reaction mixture is stirred for an additional 2 hours at 20° and then is allowed to stand in a refrigerator for 14 hours. The precipitated solid compound is removed by filtration with suction and washed with ethanol and thereafter with ether. Upon recrystallization from dimethylformamide, there is obtained one isomer of the N-oxide of 2,4-diamino-5-(2,4,5-trichloro-benzyl)-pyrimidine as beige colored crystals, melting point 298°–300° with decomposition. The hydrochloride, recrystallized from aqueous ethanol, melts with decomposition at about 300°.

The dimethylformamide is distilled under reduced pressure at 50° from the filtrate of the reaction mixture, and the resulting residue is shaken with methylene chloride and water and filtered with suction. Utilizing column chromatography as in Example 3, the other N-oxide of 2,4-diamino-5-(2,4,5-trichlorobenzyl)-pyrimidine is separated from the eluant, the hydrochloride of which is purified from methanol-ether, has a melting point of 272°–275°.

EXAMPLE 5

Preparation of the $N_1$-oxide of 2,4-diamino-5-(3,4-methylenedioxy-benzyl)-pyrimidine and the $N_3$-oxide of 2,4-diamino-5-(3,4-methylenedioxy-benzyl)-pyrimidine 48.8 g. of 2,4-diamino-5-(3,4-methylenedioxy-benzyl)-pyrimidine are suspended in 500 ml. of methylene chloride, and to this suspension are added all at once 48 g. of m-chloroper-benzoic acid. With heating, there is obtained a clear solution which is thereafter stirred for 2 hours at 20° and is allowed to stand in the refrigerator for 14 hours. The precipitated solid is removed with suction. The m-chlorobenzoic acid is extracted from the filtrate through agitation with aqueous sodium carbonate. The methylene chloride solution is washed with water, dried over sodium sulfate and evaporated. The residue and the previously precipitated solid are combined and separated by column chromatography on silica gel (eluant: chloroform, n-propanol, concentrated ammonia = 80:20:1), whereby both isomers of the N-oxide of 2,4-diamino-5-(3,4-methylenedioxy-benzyl)pyrimidine, i.e., the $N_1$-oxide of 2,4-diamino-5-(3,4-methylenedioxy-benzyl)-pyrimidine and the $N_3$-oxide of 2,4-diamino-5-(3,4-methylenedioxy-benzyl)-pyrimidine, are obtained. One N-oxide is recrystallized from water and melts with decomposition at about 260°; the other N-oxide is recrystallized as the chlorohydrate from methanolether and melts with decomposition at about 245°–150° C.

EXAMPLE 6

Utilizing the procedure described in Example 5, there can be obtained both isomers of 2,4-diamino-5-(2,4,5-trimethoxy-benzyl)-pyrimidine N-oxide. One N-oxide is recrystallized from water and melts at 218°–220°; the other N-oxide oxide is recrystallized as the chlorohydrate from methanol-either and decomposes at about 250°.

EXAMPLE 7

Utilizing the procedure described in Example 5, there can be obtained both isomers of 2,4-diamino-5-(3-benzyloxy-4,5-di-methoxy-benzyl)-pyrimidine. One N-oxide is recrystallized from water-methanol and melts at 193°–195°; the other N-oxide is recrystallized as the chlorohydrate from ethanol and melts with decomposition at 245°.

EXAMPLE 8

Utilizing the procedure described in Example 5, there can be obtained both isomers of 2,4-diamino-5-(2-bromo-4,5-methylenedioxy-benzyl)-pyrimidine. One N-oxide is recrystallized as the chlorohydrate from methanol-ether and decomposes at about 230°; the other N-oxide is also recrystallized as the chlorohydrate from ethanol-ether and decomposes at about 257°–259°.

EXAMPLE 9

Preparation of the $N_3$-oxide of 2,4-diamino-5-(3,4,5-trimethoxy-benzyl)-pyrimidine.

29,0 g of 2,4-diamino-5-(3,4,5-trimethoxy-benzyl)-pyrimidine are suspended in 200 ml of dioxane and to this suspension are added at room temperature 24,0 g m-chloro-perbenzoic acid. The mixture warms at 47° and turns reddish brown with complete dissolution, no oxidizing agent can be traced any more. The solution is stirred for an additional hour at room temperature. To the solution are added 600 ml water and 100 ml of 2N hydrochloric acid, the m-chlorobenzoic acid precipitates. This acid is removed by extracting the Congoacidic reaction mixture three times with ether. The aqueous acid phase is evaporated under reduced pressure at 50°. The residue is treated (evaporated) twice with methanol to remove the water. The yellow residue is dissolved in 400 ml of methanol at reflux temperature, 5 g of activated carbon are added, the mixture is boiled for 5 minutes and then filtered. To the clear yellow solution are added 800 ml of acetic ester. The dihydrochloride of 2,4-diamino-5-(3,4,5-trimethoxy-benzyl)-pyrimidine-$N_3$-oxide crystallizes. In order to obtain the free base, 14,6 g of the dihydrochloride are dissolved in 100 ml of water and any undissolved material is removed by filtration. The solution is adjusted to pH 8 with 2N ammonia. The base readily crystallizes. After the crystallization of this product from alcohol, 7 g of the $N_3$-oxide of 2,4-diamino-5-(3,4,5-trimethoxy-benzyl)pyrimidine are obtained.

We claim:
1. A compound of the formula

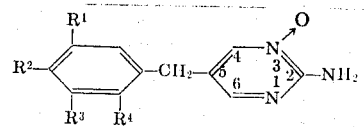

wherein $R^1$ and $R^2$ are halogen, $C_1$–$C_4$ alkoxy or benzyloxy; $R^3$ is hydrogen, halogen, $C_1$–$C_4$ alkoxy or benzyloxy; or $R^1$ together with $R^2$, or $R^2$ together with $R^3$ is methylenedioxy; and $R^4$ is hydrogen or, when $R^3$ is hydrogen, $R^4$ may also be $C_1$–$C_4$ alkoxy, $C_1$–$C_4$ alkyl, benzyloxy or halogen, and pharmaceutically acceptable acid addition salts thereof.

2. A compound in accordance with claim 1, wherein $R^4$ is hydrogen.

3. A compound in accordance with claim 2, i.e., the $N_3$-oxide of 2,4-diamino-5-(3,4,5-trimethoxybenzyl)pyrimidine and its pharmaceutically acceptable acid addition salts.

4. A compound in accordance with claim 2, i.e., the $N_3$-oxide of 2,4-diamino-5-(3,4-dimethoxybenzyl)pyrimidine and its pharmaceutically acceptable acid addition salts.

5. A compound in accordance with claim 2, i.e., the $N_3$-oxide of 2,4-diamino-5-(3,4-methylenedioxybenzyl)pyrimidine and its pharmaceutically acceptable acid addition salts.

6. A compound in accordance with claim 1, wherein $R^3$ is hydrogen.

7. A compound in accordance with claim 6, i.e., the $N_3$-oxide of 2,4-diamino-5-(4,5-dimethoxy-2-methylbenzyl)pyrimidine and its pharmaceutically acceptable acid addition salts.

8. A compound in accordance with claim 6, i.e., the $N_3$-oxide of 2,4-diamino-5-(2,4,5-trichlorobenzyl)pyrimidine and its pharmaceutically acceptable acid addition salts.

9. A compound in accordance with claim 6, i.e., the $N_3$-oxide of 2,4-diamino-5-(2,4,5-trimethoxybenzyl)pyrimidine and its pharmaceutically acceptable acid addition salts.

10. A compound in accordance with claim 6, i.e., the $N_3$-oxide of 2,4-diamino-5-(2-bromo-4,5-methylenedioxy-benzyl)-pyrimidine and its pharmaceutically acceptable acid addition salts.

11. A compound in accordance with claim 6, i.e., the $N_3$-oxide of 2,4-diamino-5-(3-benzyloxy-4,5-dimethoxy-benzyl)-pyrimidine and its pharmaceutically acceptable acid addition salts.

* * * * *

UNITED STATES PATENT OFFICE
CERTIFICATE OF CORRECTION

Patent No. 3,715,357          Dated February 6, 1973

Inventor(s)   Rey-Bellet et al.

It is certified that error appears in the above-identified patent and that said Letters Patent are hereby corrected as shown below:

Claim 1, Column 6, line 53,

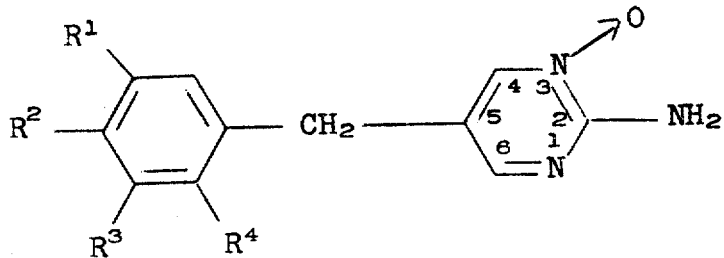

should be:

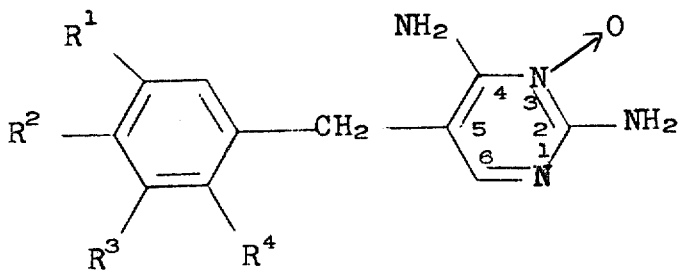

Signed and sealed this 10th day of July 1973.

(SEAL)
Attest:

EDWARD M. FLETCHER, JR.          Rene Tegtmeyer
Attesting Officer                Acting Commissioner of Patents